(12) United States Patent
Magner et al.

(10) Patent No.: US 7,552,588 B2
(45) Date of Patent: Jun. 30, 2009

(54) SYSTEM AND METHOD FOR HCCI TEMPERATURE CONTROL

(75) Inventors: Steve Magner, Farmington Hills, MI (US); Mrdjan Jankovic, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 77 days.

(21) Appl. No.: 11/305,264

(22) Filed: Dec. 15, 2005

(65) Prior Publication Data

US 2007/0137199 A1  Jun. 21, 2007

(51) Int. Cl.
*F02D 23/00* (2006.01)
(52) U.S. Cl. .......................... 60/602; 60/600
(58) Field of Classification Search .................. 60/593, 60/599, 600, 602, 605.1, 611, 614, 615
See application file for complete search history.

(56) References Cited

U.S. PATENT DOCUMENTS

| | | | |
|---|---|---|---|
| 5,036,668 A | | 8/1991 | Hardy |
| 5,957,096 A | * | 9/1999 | Clarke et al. ............. 123/90.15 |
| 6,267,097 B1 | | 7/2001 | Urushihara et al. |
| 6,276,334 B1 | | 8/2001 | Flynn et al. |
| 6,293,246 B1 | | 9/2001 | Tanahashi et al. |
| 6,295,973 B1 | | 10/2001 | Yang |
| 6,336,436 B1 | | 1/2002 | Miyakubo et al. |
| 6,390,054 B1 | | 5/2002 | Yang |
| 6,516,774 B2 | | 2/2003 | zur Loye et al. |
| 6,570,265 B1 | | 5/2003 | Shiraishi et al. |
| 6,619,254 B2 | | 9/2003 | Chmela et al. |
| 6,622,710 B2 | | 9/2003 | Hasegawa et al. |
| 6,675,579 B1 | * | 1/2004 | Yang ........................... 60/599 |

(Continued)

FOREIGN PATENT DOCUMENTS

JP     2001336440 A  * 12/2001  ................. 123/308

OTHER PUBLICATIONS

O. Lang, W. Salber, J. Hahn, S. Pischinger, K. Hortmann, C. Bücker, "Thermodynamical and Mechanical Approach Towards a Variable Valve Train for the Controlled Auto Ignition Combustion Process", SAE Technical Paper Series 2005-01-0762, Detroit, Michigan, Apr. 11-14, 2005.

(Continued)

*Primary Examiner*—Thomas Denion
*Assistant Examiner*—Douglas J. Duff
(74) *Attorney, Agent, or Firm*—Allan J. Lippa; Alleman Hall McCoy Russell & Tuttle LLP

(57) ABSTRACT

A system, comprising of an internal combustion engine having a combustion chamber with a piston located therein, an intake passage coupled to the combustion chamber, wherein the intake passage supplies intake air to the combustion chamber, an adjustable compressor arranged in the intake passage upstream of the combustion chamber, a throttle arranged in the intake passage upstream of the compressor, and a controller configured to operate the engine so that, at least under some conditions, the piston compresses an air and fuel mixture within the combustion chamber to attain substantial auto-ignition of the mixture; and to increase a boosting of the compressor to increase heating of the intake air, and to decrease the boosting to decrease heating of the intake air, while throttling the intake air with the throttle.

12 Claims, 7 Drawing Sheets

U.S. PATENT DOCUMENTS

| | | |
|---|---|---|
| 6,725,825 B1 | 4/2004 | Kurtz et al. |
| 6,739,295 B1 | 5/2004 | Yamaoka et al. |
| 6,923,167 B2 | 8/2005 | Flowers |
| 6,932,175 B2 | 8/2005 | Teraji et al. |
| 7,213,585 B2 * | 5/2007 | Yang .................. 123/543 |
| 2004/0065279 A1 | 4/2004 | Hitomi et al. |
| 2004/0182359 A1 | 9/2004 | Stewart et al. |
| 2005/0090966 A1 * | 4/2005 | Strom et al. ............ 701/109 |
| 2005/0121008 A1 * | 6/2005 | Kilkenny et al. ....... 123/568.14 |
| 2005/0173169 A1 | 8/2005 | Gray, Jr. |

OTHER PUBLICATIONS

Lang et al., "Thermodynamical and Mechanical Approach Towards a Variable Valve Train for the Controlled Auto Ignition Combustion Process," SAE Technical Paper Series, Apr. 11-14, 2005, 2005-01-0762, SAE International, Warrendale, Pennsylvania.

* cited by examiner

SYSTEM AND METHOD FOR HCCI TEMPERATURE CONTROL

BACKGROUND AND SUMMARY

Internal combustion engines may operate in a variety of combustion modes. One example mode is homogeneous charge compression ignition (HCCI), wherein an air and fuel mixture achieves a temperature where combustion occurs by autoignition without requiring a spark being performed by a sparking device. In some conditions, HCCI may have greater fuel efficiency and reduced NOx production compared to other combustion modes. However, combustion modes such as HCCI may be limited under some conditions, since a substantial amount of heat and pressure may be needed to produce combustion.

One approach to providing sufficient heat to achieve combustion is U.S. Pat. No. 6,295,973, wherein intake air is heated by heat exchangers connected to the exhaust manifold and/or engine coolant before mixing with fuel in the cylinder. However, the inventors herein have recognized a disadvantage with such an approach. Specifically, during some conditions, such as at lower engine loads and/or speeds, the engine exhaust may provide insufficient heat.

Another approach to achieving auto-ignition and controlling initial charge temperature adjusts hot residuals retained within the combustion chamber by controlling exhaust throttling to achieve increased cylinder temperature. However, the inventors herein have realized that such an approach, under some conditions, may result in additional pumping losses or may provide an insufficient amount of heat to attain autoignition.

In one approach, the above issues may be addressed by a system, comprising of an internal combustion engine having a combustion chamber with a piston located therein, an intake passage coupled to the combustion chamber, wherein the intake passage supplies intake air to the combustion chamber, an adjustable compressor arranged in the intake passage upstream of the combustion chamber, a throttle arranged in the intake passage upstream of the compressor, and a controller configured to operate the engine so that, at least under some conditions, the piston compresses an air and fuel mixture within the combustion chamber to attain substantial autoignition of the mixture; and to increase a boosting of the compressor to increase heating of the intake air, and to decrease the boosting to decrease heating of the intake air, while throttling the intake air with the throttle.

Thus, in one example, heating of the inducted intake air can be accomplished by first throttling the intake air and then heating the intake air with a compressor while restoring the intake air to approximately unthrottled, or other, conditions in the intake manifold. In this manner, a throttle and a compression device, such as powered by a variable geometry turbine turbocharger, can be operated synergistically to regulate intake air temperature and flow, which in turn can be used to achieve improved or extended HCCI operation. Further, in some embodiments, charge motion control valves and/or variable valve timing may be used as additional or alternative mechanisms to control the start and duration of combustion. In this manner, sufficient heating of the intake air may be achieved even when the engine is producing an insufficient amount of heat to otherwise sustain HCCI operation.

Further, still other advantages may be achieved. For example, by coordinating the operation of the throttling and boosting, it may be possible to vary the intake charge temperature to an appropriate level during auto-ignition operation to account for heat from other sources, such as a heat exchanger or due to residuals, without adversely affecting the total flow through the cylinders. In this way, a desired air-fuel ratio, for example, may be more accurate controlled.

DETAILED DESCRIPTION

Figure 1:
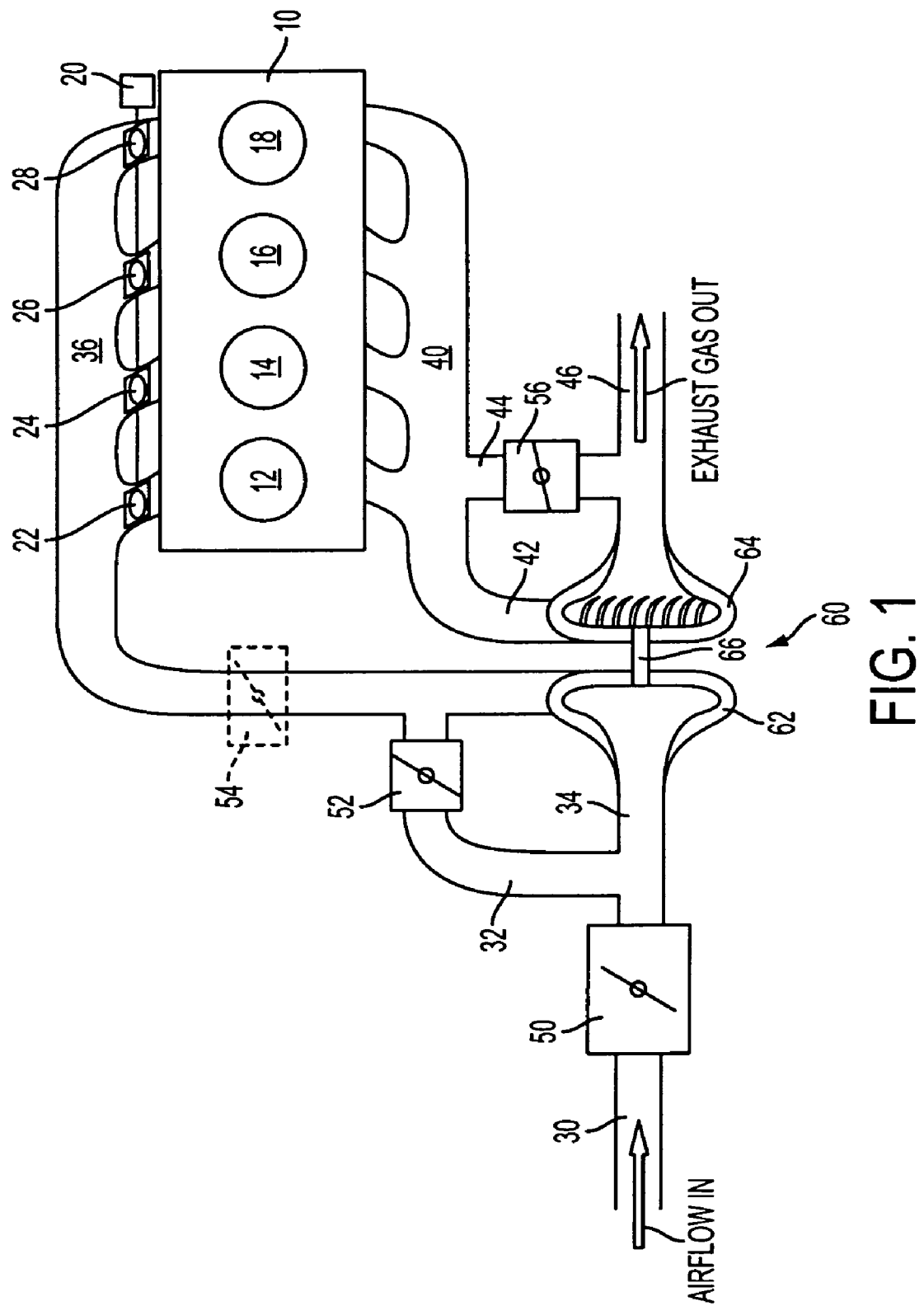
FIG. 1: An example embodiment of the intake and exhaust system of an internal combustion engine.

FIG. 1 shows an example embodiment of an internal combustion engine 10 having a plurality of combustion chambers 12, 14, 16, and 18. Engine 10 is shown having an intake manifold 36 configured to supply intake air and/or fuel to the combustion chambers and an exhaust manifold 40 configured to exhaust the combustion products from the combustion chambers. Ambient air can enter the intake system through intake air passage 30, wherein the flow rate of the intake air can be controlled at least in part by main throttle 50. A turbocharger 60, arranged downstream of main throttle 50, includes a compressor 62, which may be coupled to a variable geometry turbine (VGT) 64 by shaft 66 thereby powering the compressor. Compressor 62 is further shown arranged in compressor passage 34. Parallel to the compressor passage 34 is bypass passage 32 and compressor bypass throttle 52. Thus, the amount of intake air bypassing the compressor can be controlled by adjusting the compressor bypass throttle 52. Further, in some embodiments, compressor bypass throttle 52 may also function as a surge valve configured to allow air to flow around the compressor when the compressor causes an undesired restriction of the intake air, such as may occur at higher engine loads.

Continuing with FIG. 1, the compressor passage 34 and compressor bypass passage 32 are further shown recombining into intake manifold 36. In some embodiments, a second throttle 54 may be configured between the compressor and the engine to provide further control of the intake air. Airflow between the intake manifold 36 and each of the combustion cylinders may be further controlled, in conjunction with cylinder intake and exhaust valves (FIG. 2), by charge motion control valves (CMCV) 22, 24, 26, and, 28 each corresponding respectively to cylinders 12, 14, 16, and 18. Further, each of the CMCV can be controlled by a CMCV controller 20 or can be controlled directly by controller 100 of FIG. 2. In some embodiments, each of the CMCV can be continuously variable between a fully open position and a fully closed position. As will be described below, the CMCV can be used to provide control of the timing and duration of combustion within the combustion cylinders.

Exhaust manifold 40 is shown communicating with turbine passage 42 to enable exhaust gases to flow through variable geometry turbine (VGT) 64. In parallel with the turbine passage is turbine bypass passage 44 and waste gate 56. Thus, the amount of exhaust bypassing the VGT can be controlled by adjusting waste gate 56. Finally, turbine passage 42 and turbine bypass passage 44 are shown recombining to form exhaust passage 46 prior to exhausting to ambient.

As described above FIG. 1 shows a non-limiting example of an internal combustion engine and associated intake and exhaust systems. It should be understood that in some embodiments, the engine may have more or less combustion cylinders, control valves, throttles, and compression devices, among others. Further, in some embodiments, turbocharger 60 may alternatively be a supercharger or other compression device.

In some embodiments, the intake and/or exhaust system may further include one or more sensors configured to measure temperature and pressure at various locations. For example, an ambient air temperature sensor and pressure sensor may be arranged near the entrance of intake passage 30. Likewise, sensors may be arranged along the intake passage before and/or after the compressor, and/or within the intake manifold near the entrance to the combustion cylinder(s), among other locations. Each of these sensors may be configured to communicate with controller 100 of FIG. 2. In this manner, feedback control of the temperature and pressure of the intake air and exhaust air may be maintained by the various control mechanisms described herein.

Figure 2:
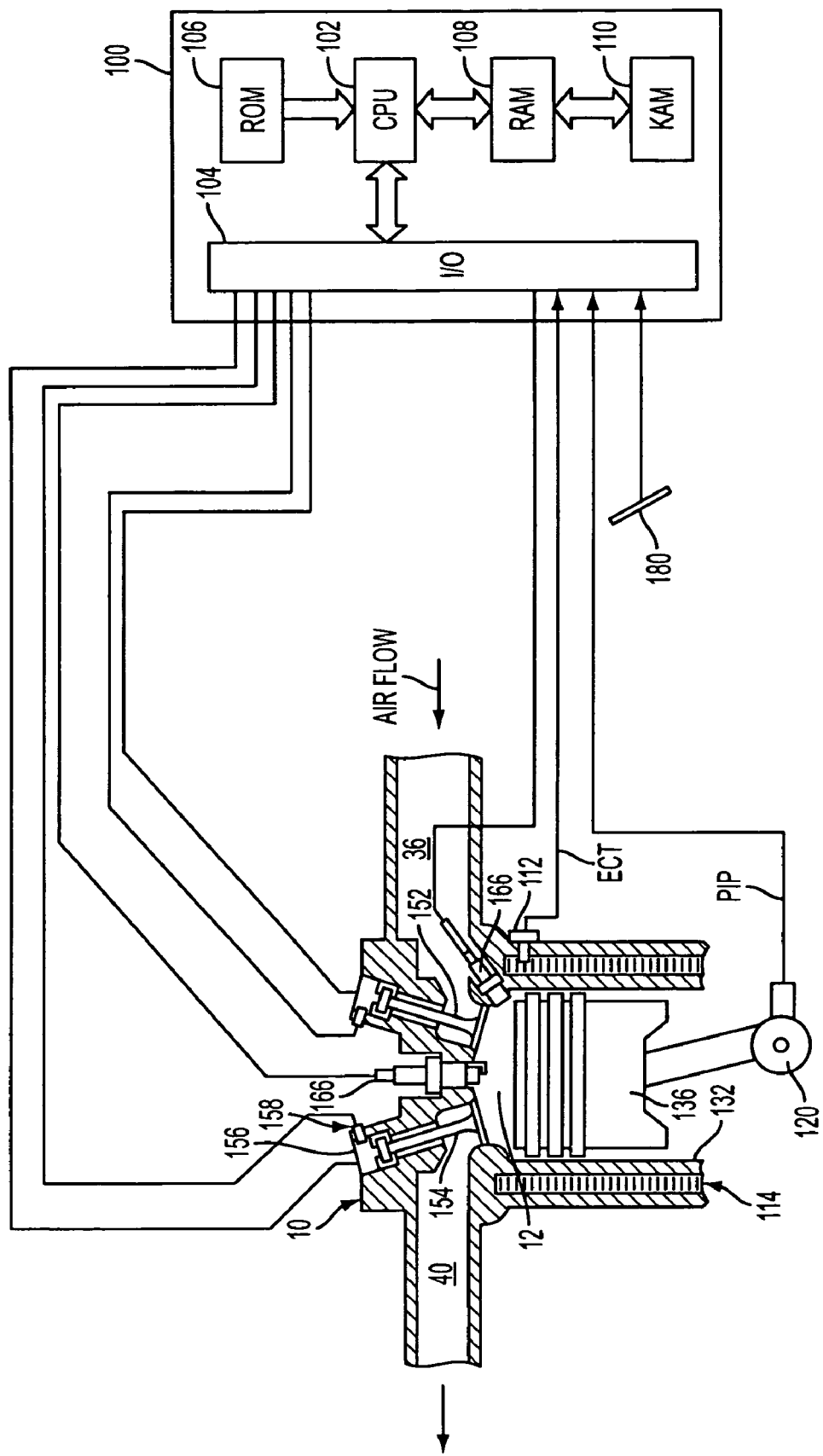
FIG. 2: An example embodiment of a combustion chamber of an internal combustion engine.

FIG. 2 shows a diagram of an example cylinder of engine 10 as described above with reference to combustion chambers 12 through 18 of FIG. 1. Engine 10 is shown as a direct injection internal combustion engine controlled by controller 100; however, in some examples, engine 10 may utilize port injection or a combination of port and direct injection to facilitate fueling of the combustion chamber. Combustion chamber 12 of engine 10 further includes combustion chamber walls 132 with piston 136 positioned therein and connected to crankshaft 120. In one example, piston 136 includes a recess or bowl (not shown) to form selected levels of stratification or homogenization of charges of air and fuel. Alternatively, a flat piston may also be used.

Combustion chamber 12 is shown communicating with intake manifold 36 and exhaust manifold 40 via respective intake valve 152, and exhaust valve 154. In some embodiments, combustion chamber 12 can include two or more exhaust and/or intake valves for controlling the flow of air into and out of the cylinder. Fuel injector 166 is shown directly coupled to combustion chamber 12 for delivering liquid fuel directly therein in proportion to the pulse width of signal received from controller 100. Controller 100 controls the amount of fuel delivered by fuel injector 166 so that the air-fuel ratio mixture in chamber 12 can be selected to be substantially at (or near) stoichiometry, a value rich of stoichiometry, or a value lean of stoichiometry. In some examples, a spark may be provided to chamber 12 via spark plug 192 in response to a signal from controller 100.

Controller 100 is shown in FIG. 2 as a microcomputer including: microprocessor unit 102, input/output ports 104, an electronic storage medium of executing programs and calibration values, shown as read-only memory chip 106 in this particular example, random access memory 108, keep alive memory 110, and a conventional data bus. Controller 100 is shown receiving various signals from sensors coupled to engine 10, in addition to those signals previously discussed, including engine coolant temperature (ECT) from temperature sensor 112 coupled to cooling sleeve 114; a profile ignition pickup signal (PIP) from Hall effect sensor 118 coupled to crankshaft 120 giving an indication of engine speed (RPM), and a pedal position sensor 180. As described above with reference to FIG. 1, controller 100 may also receive one or more signals from sensors configured to measure temperature or pressure throughout the intake and exhaust system of engine 10.

A method to control and potentially increase the heating of an inducted charge can be accomplished by utilizing main throttle 50 and turbocharger 60 as described herein. Further, turbocharger 60 may be used to increase the heating (e.g. temperature) of the intake charge while lowering engine pumping losses during HCCI operation. For some conditions, such an approach may be in contrast to previous methods that boost the intake manifold pressure above atmospheric pressure to increase the engine power output. However, in some embodiments, the turbocharger or other compression device may also be used to boost intake manifold pressure to achieve increased engine power output during various modes, including HCCI or spark ignition combustion.

Compressor 62 of the VGT turbocharger can be used to operate on the gas in the intake manifold after main throttle 50. At low engine loads and/or speeds, the flow at main throttle 50 can be restricted near or at the sonic flow limit to generate choked flow. However, main throttle 50 can be controlled to adjust the flow of intake air to any value between fully closed and fully open. After throttling, the compressor power can be used to heat the air charge while restoring the intake air to approximately unthrottled (ambient) pressure in the intake manifold, however in some conditions the compressor may be operated to provide an output pressure of less than or greater than ambient pressure. In this manner, the geometry of the VGT turbine can be varied to regulate the intake charge heating, and thus temperature, which in turn can be used to control the autoignition timing during HCCI operation. Further, by coordinating such operation with variation of intake air throttling, it is possible to vary the amount of heat addition somewhat independently of the desired manifold pressure or intake airflow.

During conventional use of a turbocharger, the expected flow capacity of the compressor and the turbine often exceed the capacity of the engine in a normally aspirated operation. Therefore, in some conditions, the turbine may not produce substantial power until a moderate level of air flow through the engine is reached. Further, in some turbocharged applications, several turbo charging devices of different sizes can used (referred to as sequential turbo-charging) in which one device operates for low gas flows and both devices operate for higher flows.

Alternatively, in an alternative approach, a smaller turbocharger may be used; and during some conditions, such as at higher flows, waste gate 56 can be used to bypass the turbine if it causes an undesirable restriction of the exhaust gas. Similarly, compressor bypass throttle 52 can be used to allow air flow to go around the compressor to avoid or reduce the flow restriction. In some embodiments, the turbocharger can be sized to be large enough to operate up to the highest air-flow (i.e. not reach a choked flow state) accommodated in the HCCI mode or other desired combustion mode.

At least two mechanisms for increasing the in-cylinder charge temperature can be applied using the various approaches described herein. The first includes the work performed by the compressor on the mass of inducted air (through the choked or near choked flow throttle) that results in increased heating/temperature. The second includes the amount of additional residual trapped in the cylinder(s) due to the elevated exhaust pressure created by the turbine.

In this manner, by adjusting a ratio and/or the absolute amount of the throttling performed by main throttle 50 and/or the compression performed by the compressor, a temperature increase may be achieved without requiring a change in ambient pressure or amount of air flow. Thus, varying the boosting does not necessitate a change of the steady state flow of air to the engine.

In order to quantify the increase in temperature of the first mechanism, a set of expressions may be used to describe the turbo charging system. Compressor power, using a simplified version of the steady flow equation and assuming an isentropic process can be described by equation 1:

$$P_c = W_c \Delta h = W_c c_p (T_{cs} - T_{in}) \qquad (1)$$

With reference to equation 1, $P_c$ is compressor power, $W_c$ is compressor gas flow, $\Delta h$ is a difference between outlet and inlet enthalpies, $c_p$, specific heat at a constant pressure, $T_{cs}$ is the temperature at the compressor outlet (with the isentropic assumption), $T_{in}$ is the temperature at the compressor inlet.

For the pressure ratio across the compressor, the isentropic temperature ratio can be found by equation 2:

$$\frac{T_{cs}}{T_{in}} = \left(\frac{p_1}{p_{in}}\right)^\mu, \qquad (2)$$

$$\mu = \frac{\gamma - 1}{\gamma} = 0.285$$

With reference to equation 2, $p_1$ is the intake manifold pressure, $p_{in}$ is the inlet compressor pressure, $\gamma$ is the specific heat ratio $c_p/c_v$ (1.4 for air).

Further, for a real compressor the power is given by:

$$P_c = W_c \Delta h = W_c c_p (T_c - T_{in}) \qquad (3)$$

With reference to equation 3, $T_c$ is the temperature at the actual compressor outlet (as opposed to $T_{cs}$)

Actual heat losses can be accounted for by introducing a term for compressor isentropic efficiency as shown in equation 4:

$$\eta_c = \frac{T_{cs} - T_{in}}{T_c - T_{in}} \qquad (4)$$

The compressor efficiency can be a function of pressure ratio and turbocharger speed (which are both dependent on the VGT setting) supplied by the turbocharger manufacturer.

Further, the power of the compressor can be derived then to be:

$$P_c = W_c c_p \frac{1}{\eta_c} T_{in}\left[\left(\frac{p_1}{p_{in}}\right)^\mu - 1\right] \qquad (5)$$

The temperature of the compressor outlet can be solved for as well:

$$T_c = T_{in}\left[1 + \frac{1}{\eta_c}\left(\left(\frac{p_1}{p_{in}}\right)^\mu - 1\right)\right] \qquad (6)$$

or as a ratio $$\frac{T_c}{T_{in}} = \left[1 + \frac{1}{\eta_c}\left(\left(\frac{p_1}{p_{in}}\right)^\mu - 1\right)\right]$$

Thus, equation 6 provides some information on how to size the VGT turbocharger. If, for example, it is assumed that the inducted air goes from 25 deg C. (305 deg K) to 150 deg C. (420 deg K), or achieves a ratio of temperature increase of 420/305=1.377. A typical compression ratio of 2 and an efficiency of 0.58 could yield the required increase in inducted air temperature to sustain HCCI at lower loads and/or speeds.

The issue of intake manifold pressure surge for the most basic realization of this method (i.e. only low flow operation) can avoid or reduce the surge limit since the method seeks to operate toward the right side of the compressor efficiency map as described below with reference to FIGS. 3 and 4. An anti-surge valve (bypass throttle 52) placed across the compressor (bypass passage 32) can suppress surge operation, therefore resulting in the compressor venting to downstream of the throttle. In some examples, the anti-surge device may vent to atmosphere, since the expectation is that surge occurs when the compressor is boosting the intake manifold at or above ambient pressure, i.e. when the turbocharger is approaching its limit to boost the engine power. However, in an alternative approach, the ambient pressure will not only be greater than the pressure at the compressor inlet, but it may also be greater than at the compressor outlet. Thus, as described above, bypass throttle 52 may also provide a surge valve operation.

Further, bypass throttle 52 may be used to bypass the compressor, such as during higher loads, since the compressor may reach a choked flow condition once the throttle is substantially opened. In other words, when the engine is operated at low load conditions, main throttle 50 can be used to restrict flow, which may cause the compressor inlet pressure to be low, and the compressor may be operated so that the compressor outlet pressure may be below ambient. If surge is encountered, bypass throttle 52 can be opened and the outlet pressure can be reduced by venting to the inlet pressure side. Once the throttle opens sufficiently so that the compressor begins to limit the flow, the bypass valve can allow additional air to reach the engine.

Figure 3:
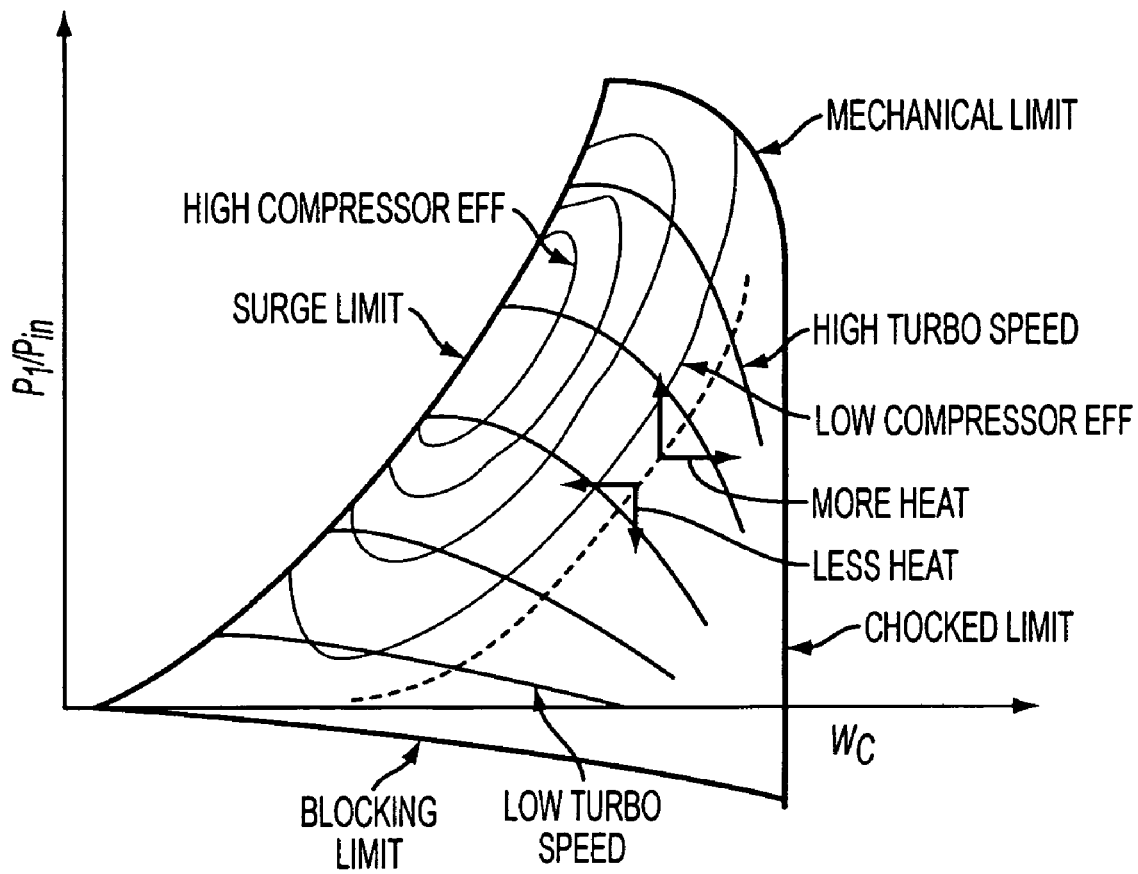
FIG. 3: An example compressor efficiency map.

In order to better visualize the compressor operation, a compressor efficiency map is shown in FIG. 3. The horizontal axis of FIG. 3 corresponds to the airflow through the compressor ($W_c$). For a given compressor design the flow reaches a maximum, which is shown as the choke limit, in which the narrowest section of the compressor reaches the sonic flow limit. The vertical axis corresponds to the pressure ratio across the compressor ($p_1/p_{in}$). The curve that forms a border on the left side of the compressor operating space is the surge limit, in which the compressor can no longer sustain the pressure across it. The upper boundary curve is the mechanical limit, essentially the highest speed the turbocharger can rotate and remain intact. The curves beginning at the surge limit curve and are below the mechanical limit are constant turbocharger rotor speeds. Finally the circular curves are shown forming "islands" of compressor efficiency used to produce an increase in mass flow versus increasing temperature. The inner islands are the higher efficiency locales (typically around 0.75) and the outer islands are lower efficiency (typically around 0.55). The lower boundary is the blocking limit in which the turbo is not spinning fast enough to let air through.

Figure 4:
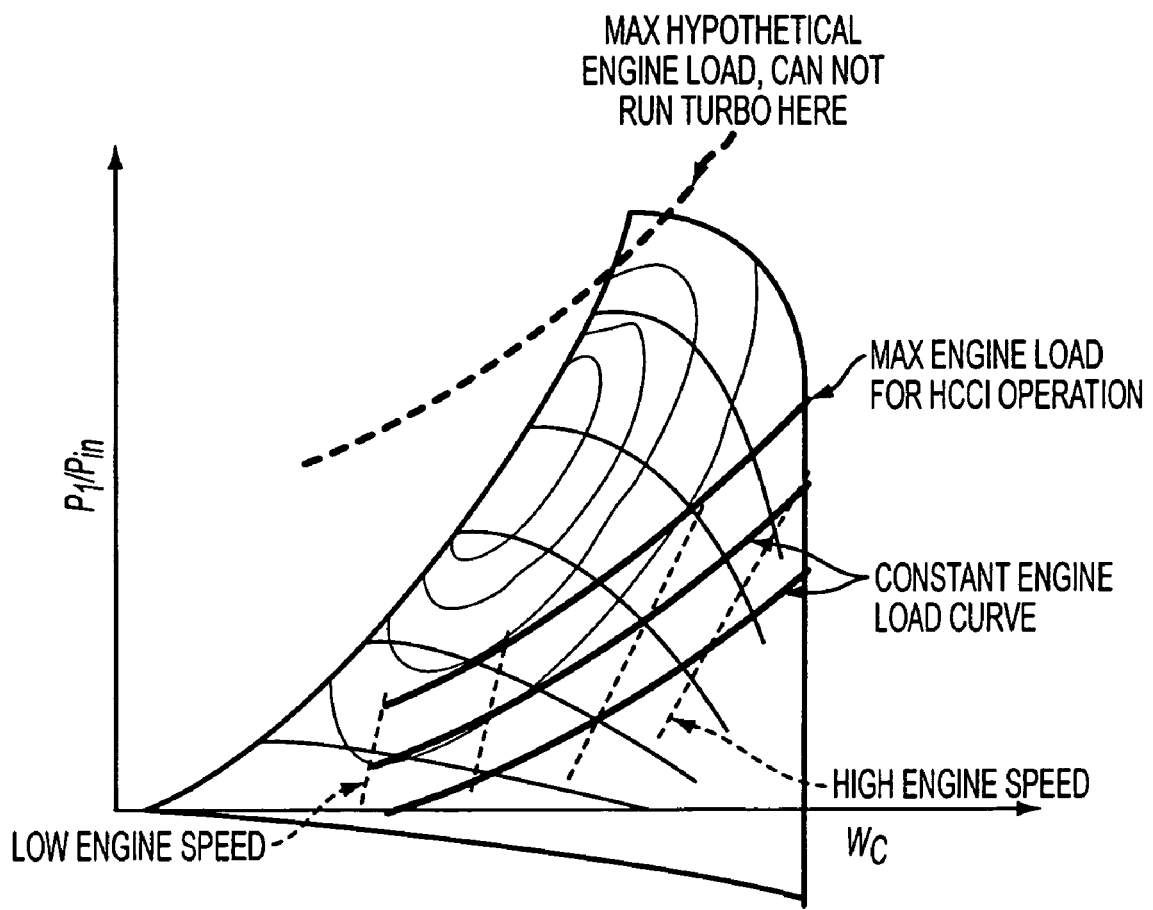
FIG. 4: An example compressor efficiency map with an engine operating region.

FIG. 4 places the engine speed and torque load lines on the compressor map. For conventional uses of a turbocharger, the turbocharger design seeks to place the moderate to high speeds and loads of the engine into the high efficiency region of the compressor map, with the maximum load falling below and to the right of the surge line. Additionally, the speed and load of the engine can not cross over the choke flow limit to the right. In contrast, in some embodiments, the approach disclosed herein can use a turbocharger design that only accommodates the HCCI portion of the engine operation (e.g. lower engine speeds and loads).

In order to generate heat in the inducted charge, in some examples the controller may operate the system in the inefficient pressure increasing region of the compressor map. The low efficiency curves, however, occupy a large range of gas flows and compressor ratios. One consideration when using a compressor to generate heat is that the system may need to be inefficient when the compressor is generating power. Thus, the correctly sized turbo charger can operate at the desired low load/speed HCCI intake flows as shown in the middle left side portion of the compressor map. Further, the VGT can affect the compressor by ultimately affecting the speed of the turbocharger. As the VGT alters the turbine power, a difference between the turbine and compressor power may act on the inertia of the turbocharger, thus changing the rotational speed. Eventually the power output of the compressor matches the turbine power due to the change in speed thereby the system reaches a new equilibrium.

The second mechanism for generating heat uses variable exhaust and/or intake valve timing, for example. In one embodiment, if the exhaust closes shortly after the piston completes its exhaust stroke thereby pushing out the residual gas, then the exhaust manifold pressure may play a smaller role in hindering the exhaust of combusted gases. Alternatively, if the exhaust valve closes later, then the higher pressure of the exhaust manifold may become more significant in forcing residual back into the cylinder. As a result, the increase in the exhaust pressure caused by the turbine can be used to increase the cylinder charge temperature, which in turn can depend on the closing time of the exhaust valve(s).

Under some conditions, using a turbocharger or other compression device to control in-cylinder temperature, while sufficient to maintain the HCCI combustion, may not provide rapid enough control for fine tuning the start of combustion. Thus, the exhaust valve timing can be used for this purpose in one embodiment. Specifically, in some embodiments, the exhaust valve closing (EVC) can be regulated to achieve the appropriate amount of residual and, thus, the desired in-cylinder temperature and auto-ignition timing. In some embodiments, the EVC can be controlled either in the closed loop through, for example, a conventional PID regulator, from, an in-cylinder pressure or ionization sensor or alternatively in a feedforward manner based on the intake and exhaust pressure and temperature measurements or estimates.

In some embodiments, in addition or instead of the exhaust valve timing, the CMCV can be used. For example, the CMCV can be closed or reduced to increase turbulence of intake air at low speed and/or low load operating conditions. At high speeds and/or loads it can be opened or increased to prevent choking the flow into the cylinders. Since, turbulence is one factor that can affect the start and duration of combustion, a continuously variable CMCV can be used for control. As described above with reference to in the exhaust valve closing control, the CMCV can be operated in closed loop or in a feedforward mode.

Figure 5:
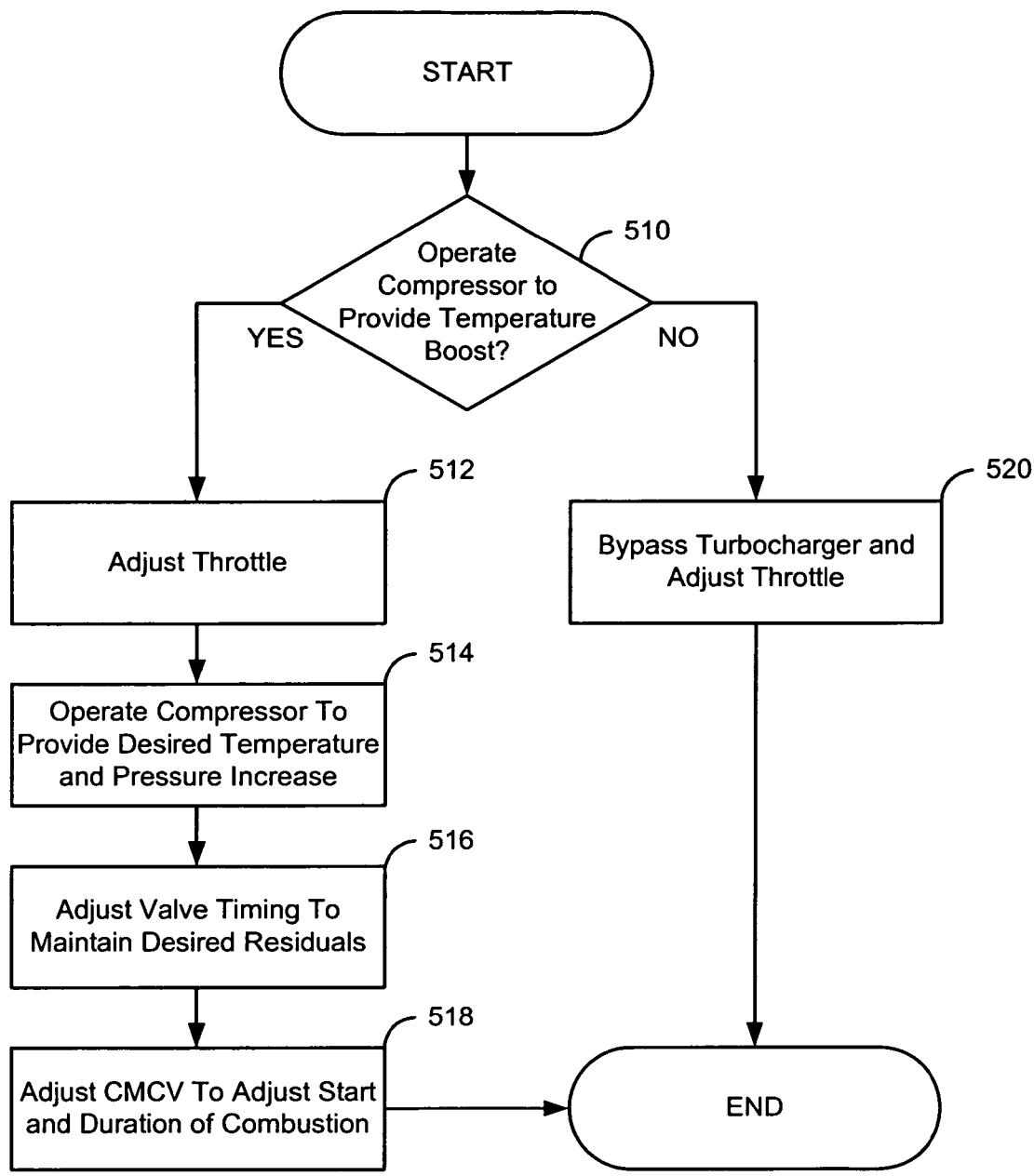
FIG. 5: A flow chart of an example method for providing intake charge heating.

FIG. 5 shows a flow chart of an example routine for providing temperature and pressure control for an internal combustion engine using the methods described above. Beginning with step 510, it is judged whether the compressor should be operated to adjust the temperature and/or pressure of the intake air. If the answer is yes, the routine performs steps 512 through 518, which includes adjusting the throttle (step 512), adjusting the VGT so that the compressor provides the desired temperature and/or pressure increase (step 514), adjusting the exhaust and/or intake valve timing to maintain the desired residuals (step 516), and adjusting the CMCV to control the start and duration of combustion. The methods described above may be adjusted based on at least the engine operating conditions, which may include: ambient air temperature and pressure, engine load, engine speed, engine combustion mode, number of deactivated cylinders, turbocharging conditions, and engine temperature, among others.

Continuing with FIG. 5, alternatively, if it is judged that temperature and/or pressure boosting via the compressor is not desired, then the routine may perform step 520, wherein the turbocharger is bypassed using bypass throttle 52 and/or waste gate 56. Finally, the routine ends.

Figure 6:
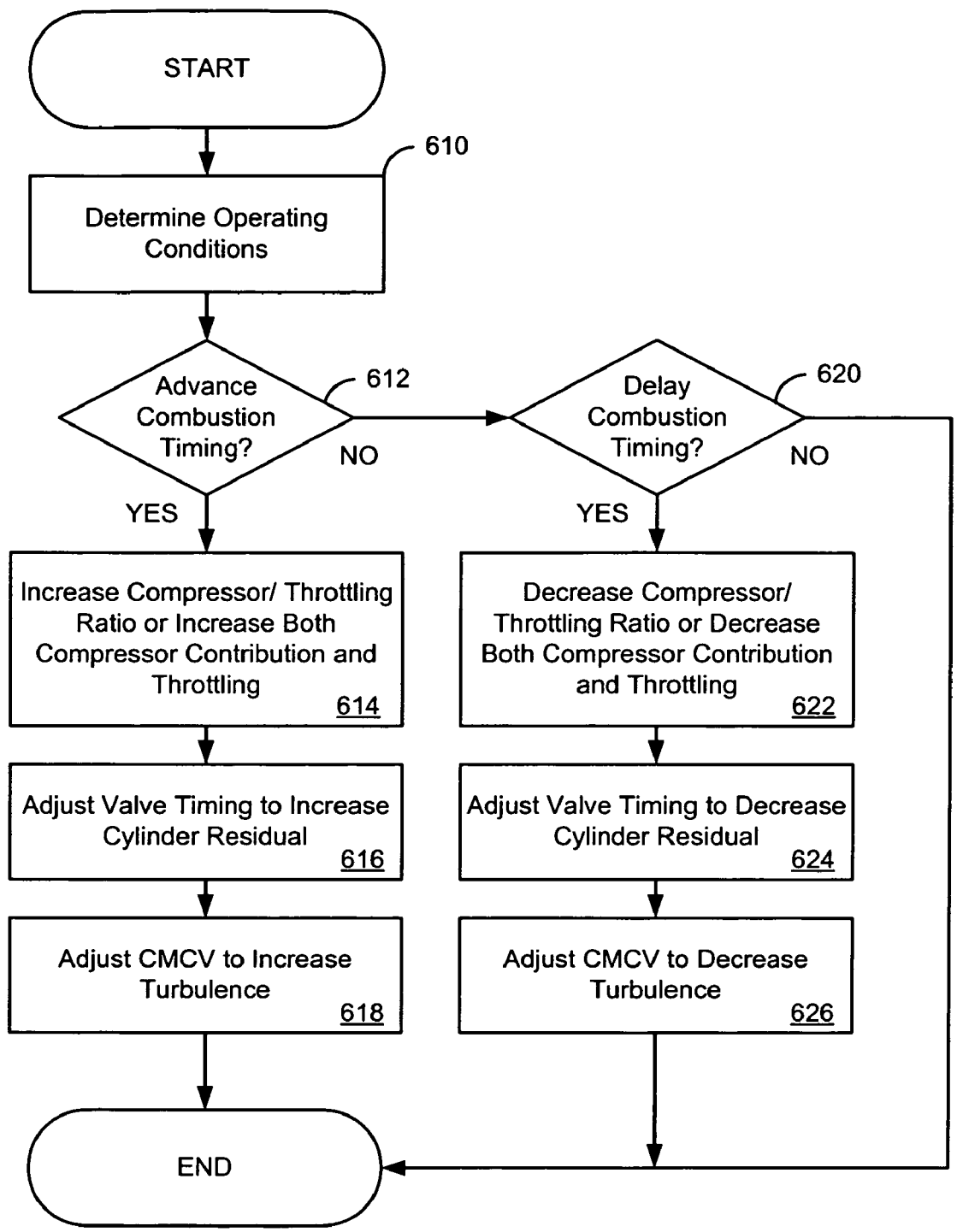
FIG. 6: A flow chart of an example routine for controlling engine operations based on a desired change of the combustion timing.

FIG. 6 shows a flow chart of an example routine for controlling engine operations based on a desired change of the combustion timing. Beginning at step 610, the operating conditions of the engine and engine systems are determined. This may include measurements supplied by various sensors and/or estimates performed by the controller, among others. At 612, it is judged whether the combustion timing should be advanced (i.e. combustion occurs earlier in the cycle). If the answer is yes, one or more of steps 614 through 618 may be performed, which include at step 614, increasing the compressor contribution (via VGT) to throttling (i.e. operating the compressor to perform more compression versus the amount of throttling performed by main throttle 50), or increasing both the compressor contribution and the throttling, thereby increasing charge temperature and/or pressure. Further, the valve timing may be adjusted to increase the amount of in-cylinder residual remaining after each exhaust stroke (step 616) and/or adjusting the CMCV (swirl valve) to increase turbulence (step 618) thereby promoting mixing within the cylinder.

Alternatively, if the answer at step 612 is no, it may be judged at step 620 whether the combustion timing should be delayed (i.e. combustion occurs later in the cycle). If the answer is yes, one or more of steps 622 through 626 may be performed. For example, at step 622, decreasing the ratio of compressor contribution versus throttling (i.e. operating the compressor to perform less compression versus the amount of throttling performed by main throttle 50), or decreasing the compressor contribution and the throttling, thereby reducing charge temperature and/or pressure. Further, the valve timing may be adjusted to decrease the amount of in-cylinder residual remaining after each exhaust stroke (step 624) and/or adjusting the CMCV (swirl valve) to decrease turbulence (step 626), thereby reducing mixing within the cylinder. Alternatively, if no change of the timing of combustion is to be made, then the routine ends.

Figure 7:
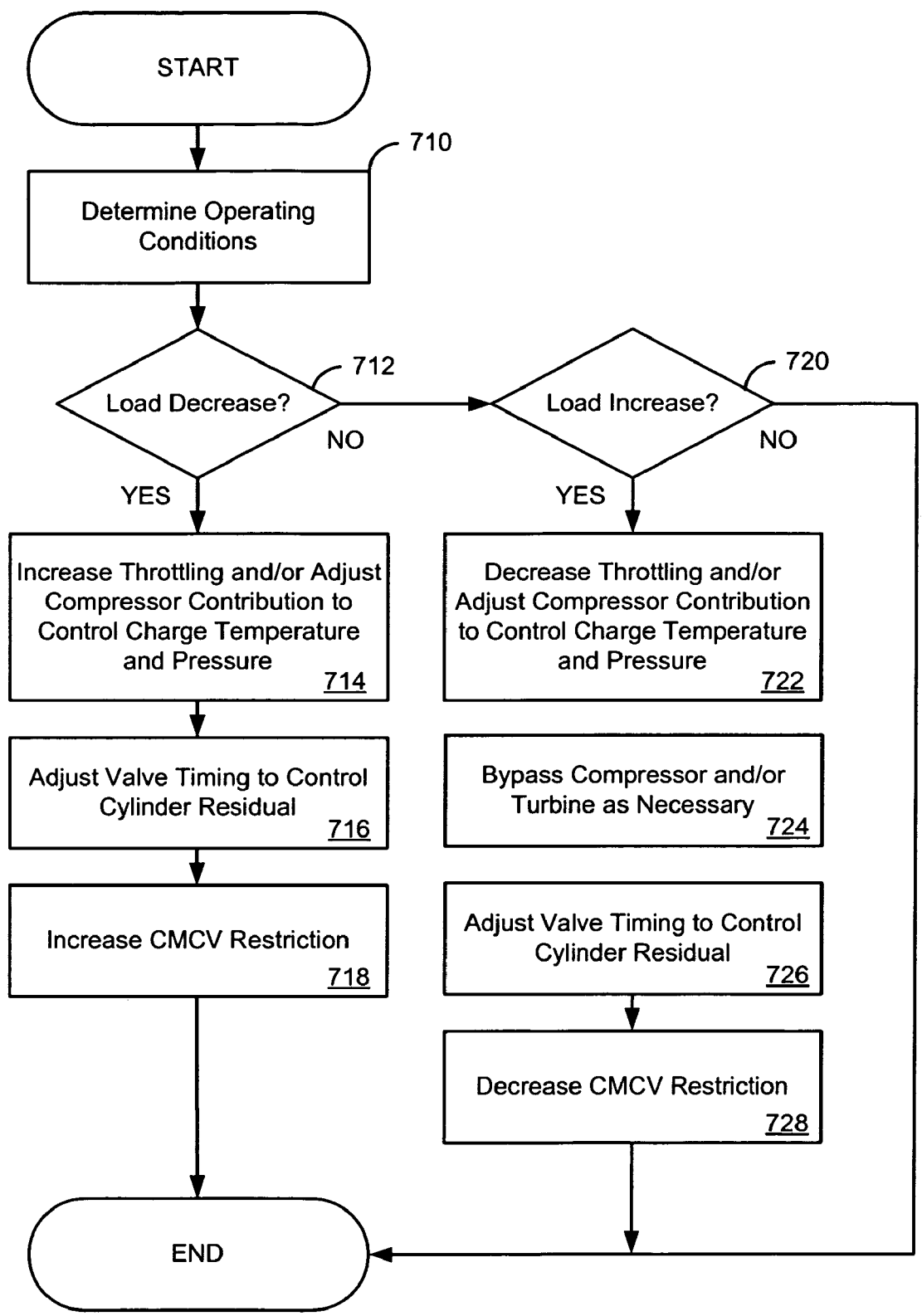
FIG. 7: A flow chart of an example routine for controlling engine operations based on a change in engine load.

FIG. 7 shows a flow chart of an example routine for controlling engine operations based on a change in engine load. Beginning at step 710, the operating conditions of the engine and engine systems are determined. This may include measurements supplied by various sensors and/or estimates performed by the controller, among others. At 712, it is judged whether the engine load, engine torque demand, or engine airflow, is decreased. If the answer is yes, one or more of steps 714 through 718 may be performed, which include at step 714, increasing the throttling and/or adjusting the compressor contribution to control charge temperature and pressure. Further, the valve timing may be adjusted to control the amount of in-cylinder residual remaining after each exhaust stroke (step 716) and/or increasing the CMCV (swirl valve) restriction to provide additional in-cylinder mixing.

Alternatively, if the answer at step 712 is no, it may be judged at step 720 whether the engine load is increased. If the answer is yes, one or more of steps 722 through 728 may be performed. For example, at step 722, decreasing the throttling and/or adjusting the compressor contribution to control charge temperature and/or pressure. Further, the compressor and/or turbine may be bypassed as described above with reference to FIG. 1. Further, the valve timing may be adjusted to control the amount of in-cylinder residual remaining after each exhaust stroke (step 726) and/or adjusting the CMCV (swirl valve) to decrease the restriction to avoid choking the engine. Alternatively, if no change engine load is encountered, the routine ends.

In summary, as the timing of autoignition of an air and fuel mixture depends upon at least the charge (air and fuel mixture) temperature and pressure, the methods described herein utilize adjusting the amount of throttling and/or the amount of compression performed by the compressor to achieve the desired temperature and/or pressure boost, while providing a desired amount of air flow. Thus, in some examples, the throttling process can be performed on the ambient air to cause a pressure decrease, while not causing a substantial temperature decrease. The compressor can be operated to boost the pressure back to the ambient pressure, below the ambient pressure, or above the ambient pressure, while simultaneously increasing the temperature of the air. During engine operations, as variations in engine load, speed, or other conditions occur, the throttling and/or compressor contribution may be adjusted to maintain the desired combustion timing. Further, fine tuning of the charge temperature and timing of combustion may be performed by adjusting the intake and/or exhaust valve timing, and/or adjusting the CMCV valves accordingly. In this manner, charge temperature control of the engine may be maintained even when the heat produced by the engine is insufficient to achieve the desired temperature control.

Note that the example control and estimation routines included herein can be used with various engine configurations and further represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into a computer readable storage medium in engine controller 100.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Also, the various methods for achieving and controlling intake charge heating disclosed herein may be applied to other combustion modes, such as such as spark ignition (SI), non-homogeneous compression ignition, or HCCI with an assist spark, among others.

The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A system, comprising:
an internal combustion engine having a combustion chamber with a piston located therein;
an intake passage coupled to the combustion chamber, wherein the intake passage supplies intake air to the combustion chamber;
an adjustable compressor arranged in the intake passage upstream of the combustion chamber;
a throttle arranged in the intake passage upstream of the compressor; and
a controller configured to operate the engine so that, at least under some conditions, the piston compresses a homogeneous air and fuel mixture within the combustion chamber to attain substantial auto-ignition of the mixture; and to increase a boosting of the compressor to increase heating of the intake air, and to decrease the boosting to decrease heating of the intake air, while throttling the intake air with the throttle;
wherein said controller adjusts said throttling and boosting in response to auto-ignition timing and wherein the controller is further configured to adjust a throttle position and a compressor condition so that a decrease of temperature of the intake air across the throttle is less than an increase of temperature of the intake air across the compressor.

2. The system of claim 1, wherein boosting of the compressor is adjusted by adjusting a bypass around the compressor.

3. The system of claim 1, wherein the bypass around the compressor is adjusted based on at least a desired airflow and a pressure difference between an inlet and an outlet of the compressor.

4. The system of claim 3, wherein the controller is further configured to adjust the throttle so that the intake air flowing through the throttle is choked at least under one condition.

5. The system of claim 3, wherein a pressure of the intake air at an output of the compressor is approximately equal to or less than a pressure upstream of the throttle, at least under some conditions.

6. The system of claim 1, further comprising an exhaust passage coupled to the combustion chamber and a turbine coupled in the exhaust passage, wherein the turbine is coupled to the compressor.

7. The system of claim 6, wherein said controller further adjusts said turbine in response to auto-ignition timing.

8. The system of claim 7, wherein said turbine is adjusted by adjusting a bypass around the turbine.

9. The system of claim 7, wherein said turbine is adjusted by adjusting vanes of the turbine.

10. An engine, comprising:
a combustion chamber;
a piston disposed within the combustion chamber configured to compress a mixture of air and fuel;
an intake passage communicating with the combustion chamber configured to supply air to the combustion chamber;
an exhaust passage coupled to the combustion chamber configured to exhaust combustion products from the combustion chamber;
an exhaust valve arranged between the combustion chamber and the exhaust passage, wherein the exhaust valve is configured to open and close to control a flow of combustion products from the combustion chamber into the exhaust passage;

a compressor arranged in the intake passage upstream of the combustion chamber, wherein the compressor is configured to impart heating to the airflow;

a variable geometry turbine coupled to the compressor and arranged in the exhaust passage downstream of the combustion chamber, wherein adjusting a condition of the turbine causes a condition of the compressor to vary;

a throttle arranged in the intake passage upstream of the compressor; and a controller configured to adjust an operating condition of the engine so that the piston compresses the mixture of air and fuel to achieve auto-ignition of the mixture, adjust the throttle so that an airflow through the throttle is choked, adjust the geometry of the turbine to vary an amount of said heating imparted to the airflow to control a timing of said auto-ignition, and adjust at least one of a timing and a lift of the exhaust valve to control an amount of combustion residual remaining in the combustion chamber.

11. The engine of claim 10, further comprising a charge motion valve arranged in the intake passage between the compressor and the combustion chamber, wherein the charge motion valve is configured vary a condition of the air supplied to the combustion chamber.

12. The engine of claim 11, wherein the controller is further configured to adjust a condition of the charge motion valve to control the timing of said auto-ignition.

* * * * *